(12) United States Patent  
Yin (10) Patent No.: US 8,382,209 B2  
(45) Date of Patent: Feb. 26, 2013

(54) ROTARY WHEEL CAP

(76) Inventor: Chih-Hao Yin, Auckland (NZ)

( * ) Notice: Subject to any disclaimer, the term of this patent is extended or adjusted under 35 U.S.C. 154(b) by 398 days.

(21) Appl. No.: 12/764,486

(22) Filed: Apr. 21, 2010

(65) Prior Publication Data

US 2011/0260524 A1    Oct. 27, 2011

(51) Int. Cl.
*B60B 19/10* (2006.01)

(52) U.S. Cl. ..................................... 301/6.3; 301/37.25

(58) Field of Classification Search ............. 301/37.101, 301/37.25, 37.26, 37.108, 37.109, 6.3, 6.4; 40/587

See application file for complete search history.

(56) References Cited

U.S. PATENT DOCUMENTS

| 4,457,560 A | 7/1984 | Rowe et al. |
| 5,490,342 A | 2/1996 | Rutterman et al. |
| 6,585,330 B2 | 7/2003 | Bruce |
| 2002/0175559 A1* | 11/2002 | Inoue et al. ............... 301/37.101 |
| 2010/0170123 A1* | 7/2010 | DoVale et al. ................... 40/587 |

* cited by examiner

*Primary Examiner* — Jason Bellinger  
*Assistant Examiner* — Jean Charleston  
(74) *Attorney, Agent, or Firm* — Muncy, Geissler, Olds & Lowe, PLLC (57) ABSTRACT

A rotary wheel cap includes a fixed base fixed to a center of a wheel, a rotary cover axially mounted onto the fixed base, and an elastic member installed between the fixed base and rotary cover. When the wheel rotates, the rotary cover compresses the elastic member to a first position to form a positioning relationship with the fixed base, such that the rotary cover is rotated with the wheel and fixed base at the first position. When the wheel is still, the rotary cover is supported by the elastic member at a second position to release the positioning relationship with the fixed base. The rotary cover is rotated axially with respect to the fixed base by gravitation of a weight balancing portion at the second position. A design pattern on the rotary cover is aligned correctly by the axial rotation of the rotary cover when the wheel is still.

10 Claims, 9 Drawing Sheets

ROTARY WHEEL CAP

FIELD OF THE INVENTION

The present invention relates to a rotary wheel cap, and more particularly to a rotary wheel cap installed at the center of a wheel, and decorated by a brand logo or a design pattern.

BACKGROUND OF THE INVENTION

In motor vehicles, a wheel cap is generally installed on an outer side of a wheel axle. The wheel cap not only covers the rigid mechanical structure of the wheel and serves as a decoration, but also protects a wheel bearing. As disclosed in U.S. Pat. Nos. 4,457,560 and 6,585,330, a wheel cap is secured onto a wheel by screws and nuts, such that when the wheel is rotated, the wheel cap will be rotated synchronously, and will not be separated from the wheel during the rotation.

In general, most wheel caps of wheels come with a brand logo of a motor vehicle or the wheel, and such arrangement not only serves as a decoration, but also achieves effect of advertising and promoting the brand of the motor vehicle or the wheel. However, the wheel caps disclosed in the aforementioned two prior arts are rotated with the wheels synchronously, so that when the wheel is still, the brand logo on the wheel cap will be rotated to an uncertain angle or position, such as an overturn angle of 90 degrees or 180 degrees from the relative correct position. As a result, the brand logo is deflective or upside down, and people cannot recognize the meaning of the brand logo on the wheel cap easily.

Further, U.S. Pat. No. 5,490,342 discloses a wheel cap comprising a fixed cover mounted onto a wheel, and a movable cover mounted onto the fixed cover, wherein the movable cover includes an axle strut for coupling with a bearing on the fixed cover, so that the movable cover and the fixed cover can be rotated axially with respect to each other, and the movable cover includes a balance weight, such that the movable cover can be maintained at a predetermined angle and position by means of the gravitation of the balance weight and the axial rotation of the bearing whether the wheel drives the fixed cover to rotate or not.

SUMMARY OF THE INVENTION

Therefore, it is a primary objective of the present invention to provide a rotary wheel cap that can be rotated synchronously with a wheel of a motor vehicle when the motor vehicle is driven, and the rotary wheel cap is rotated axially by itself to a correct position when the motor vehicle is stopped.

To achieve the foregoing objective, the present invention provides a rotary wheel cap comprising a fixed base fixed at the center of a wheel, a rotary cover axially mounted onto the fixed base, and an elastic member installed between the fixed base and the rotary cover, wherein the fixed base includes an air suction portion driven by the fixed base and rotated with the wheel for sucking external air, and the rotary cover is rotated axially with respect to the fixed base and includes a weight balancing portion, and the fixed base and the rotary cover include respectively a first positioning portion and a second positioning portion correspondingly.

When the motor vehicle is driven, the wheel drives the fixed portion and the air suction portion to rotate, and the air suction portion sucks the rotary cover to compress the elastic member, such that the rotary cover is situated at a first position to define a positioning relationship between the first and second positioning portions, so that the rotary cover is rotated with the wheel at the first position. When the motor vehicle is stopped, the wheel, the fixed base and the air suction portion are stopped at the same time, and the rotary cover is situated at a second position and elastically supported by the elastic member to release the positioning relationship between the first and second positioning portions, so that the rotary cover is rotated axially with respect to the fixed base by the weight of the weight balancing portion at the second position.

DETAILED DESCRIPTION OF THE PREFERRED EMBODIMENTS

The technical contents of the invention will now be described in more detail hereinafter with reference to the accompanying drawings that show various embodiments of the invention.

Figure 1:
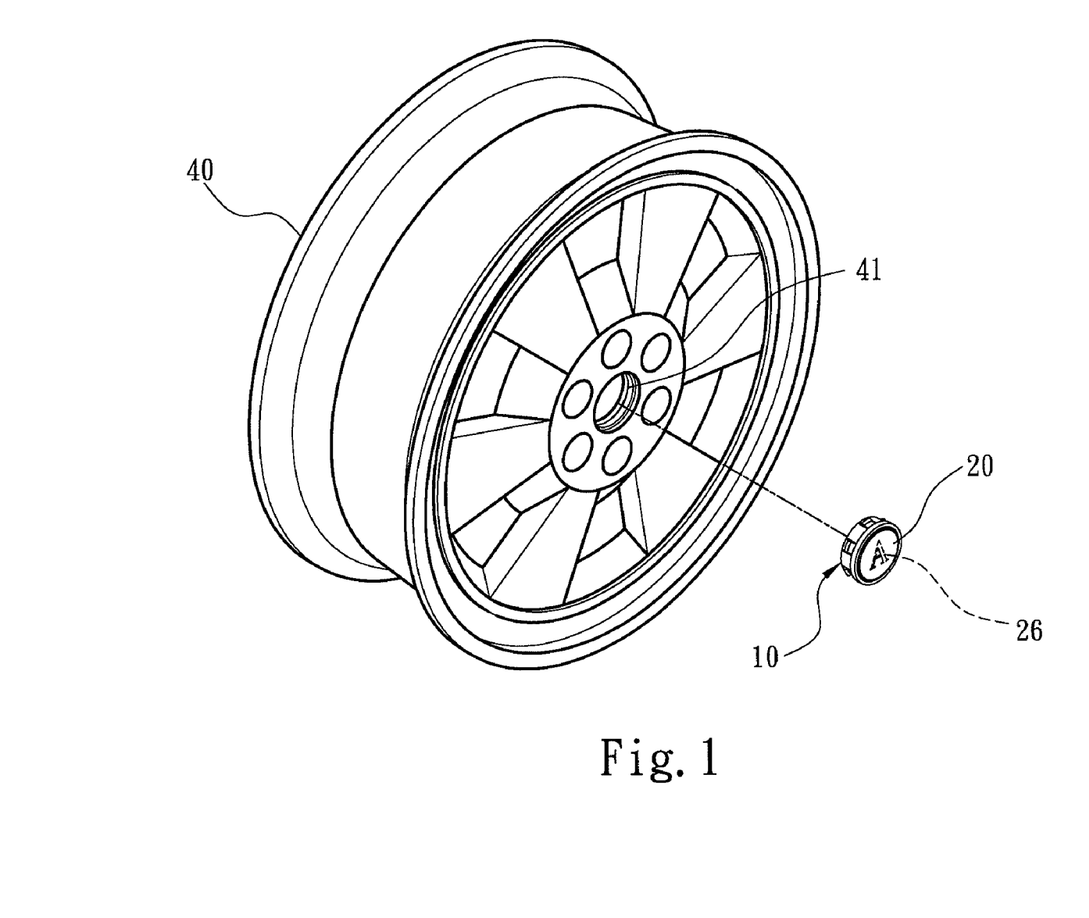
FIG. 1 is a perspective view of the present invention.

Refer to FIG. 1 for a rotary wheel cap of the present invention, the rotary wheel cap is installed at a center 41 of a wheel 40, and a design pattern 26 such as a brand logo of a motor vehicle, a brand logo of the wheel, or any other character or pattern is used for decorating the wheel.

Figure 2:
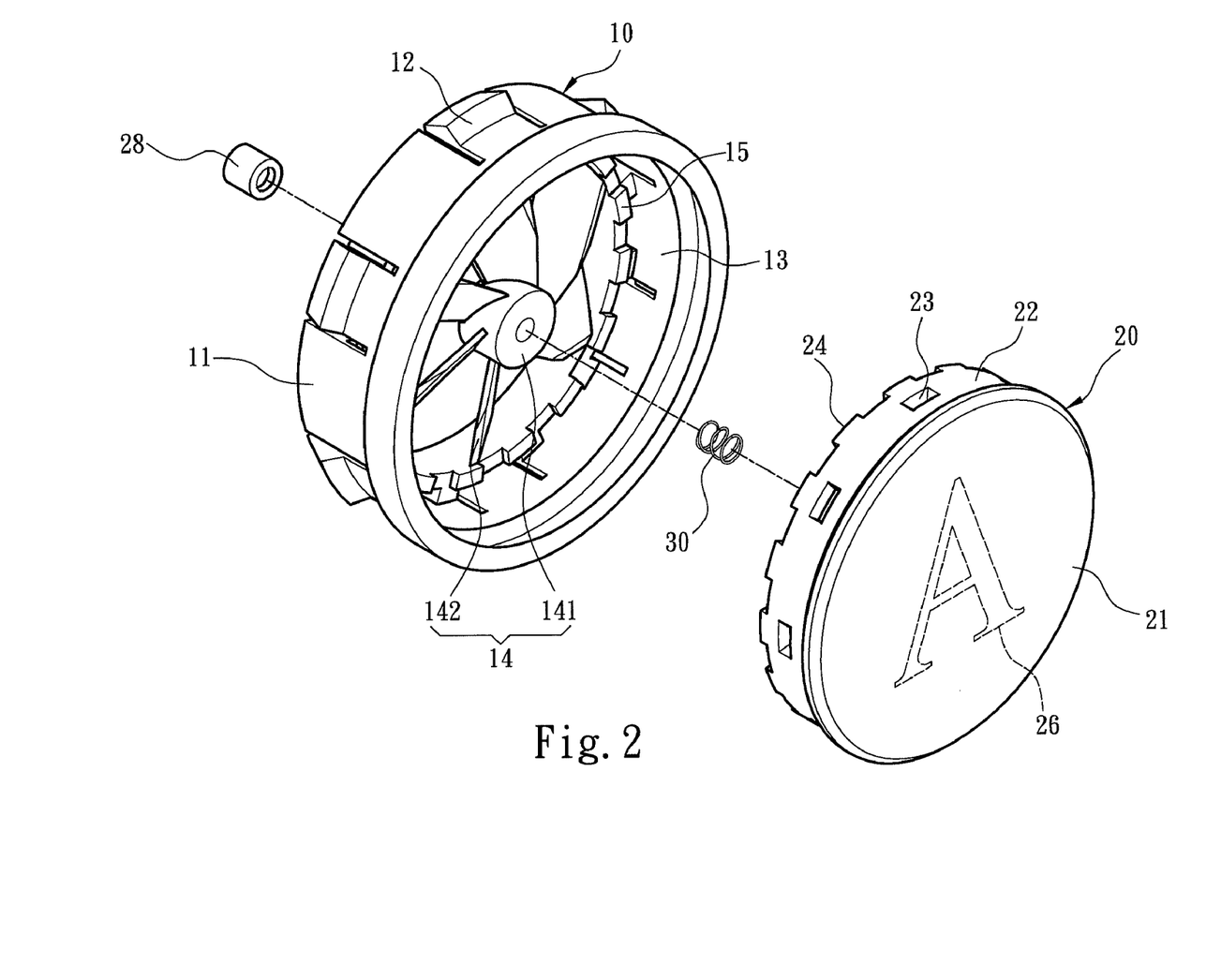
FIG. 2 is an exploded view of the present invention.
Figure 3:
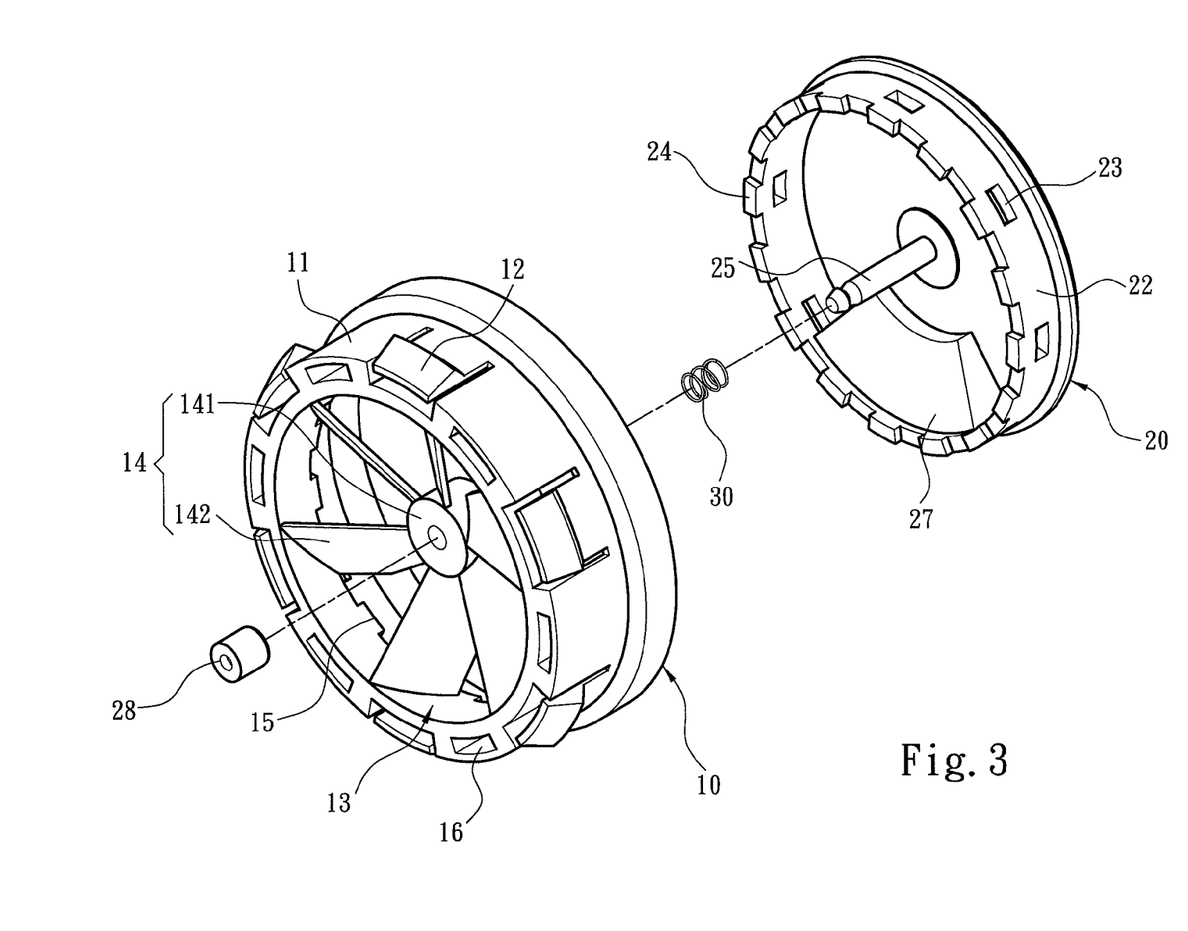
FIG. 3 is another exploded view of the present invention.

Refer to FIGS. 2 and 3 for the detailed illustration of a rotary wheel cap in accordance with the present invention, the rotary wheel cap comprises a fixed base 10, a rotary cover 20 mounted onto the fixed base 10, and an elastic member 30 installed between the fixed base 10 and the rotary cover 20, wherein the fixed base 10 includes an outer annular portion 11, and the outer annular portion 11 includes a plurality of latch hooks 12 disposed on an outer side thereof for latching and positioning the center 41 of the wheel 40, and an airflow passage 13 having an air suction portion 14 on an inner side, wherein the air suction portion 14 of the present invention is a fan having an axis portion 141 and a plurality of blade portions 142 disposed around the axis portion 141 and coupled to the outer annular portion 11, so that the air suction portion 14 can be driven by the fixed base 10 and rotated with the wheel 40 for sucking external air.

The rotary cover 20 includes a panel 21 and an inner annular portion 22 connected to the panel 21 and held in the inner annular portion 11. The panel 21 has a design pattern 26 on an outer side, such as a brand logo of a motor vehicle or a brand logo of a wheel. To illustrate the present invention, a letter "A" is served as a representative. The rotary cover 20 further includes a weight balancing portion 27 disposed on an inner side of the panel 21, and an axle strut 25 passing through the axis portion 141, such that the rotary cover 20 axially installed at the fixed base 10 is rotated axially with respect to the fixed base 10, and the rotary cover 20 is rotated to a fixed position by the gravitation of the weight balancing portion 27 in a normal condition. In other words, the weight balancing portion 27 is situated at the lowest position which generally sets the design pattern 26 in a correctly aligned position. The axle strut 25 has a fixing cap 28 at an end for preventing the axle strut 25 from separating the axis portion 141. Further, the outer annular portion 11 of the fixed base 10 and the inner annular portion 22 of the rotary cover 20 have respectively a first positioning portion 15 and a second positioning portion 24 correspondingly. In one embodiment of the present invention, the first positioning portion 15 and the second positioning portion 24 are corresponding latching concave and convex structures. In addition, the fixed base 10 and the rotary cover 20 include a plurality of apertures 16, 23 for guiding air while the wheel 40 is rotated. The elastic member 30 is a spring penetrated by the axle strut 25 and installed between the panel 21 of the rotary cover 20 and the axis portion 141 of the fixed base 10, and the rotary cover 20 is separated from the fixed base 10 in a normal condition. The aforementioned elements constitute the main structure of the present invention.

Figure 4A:
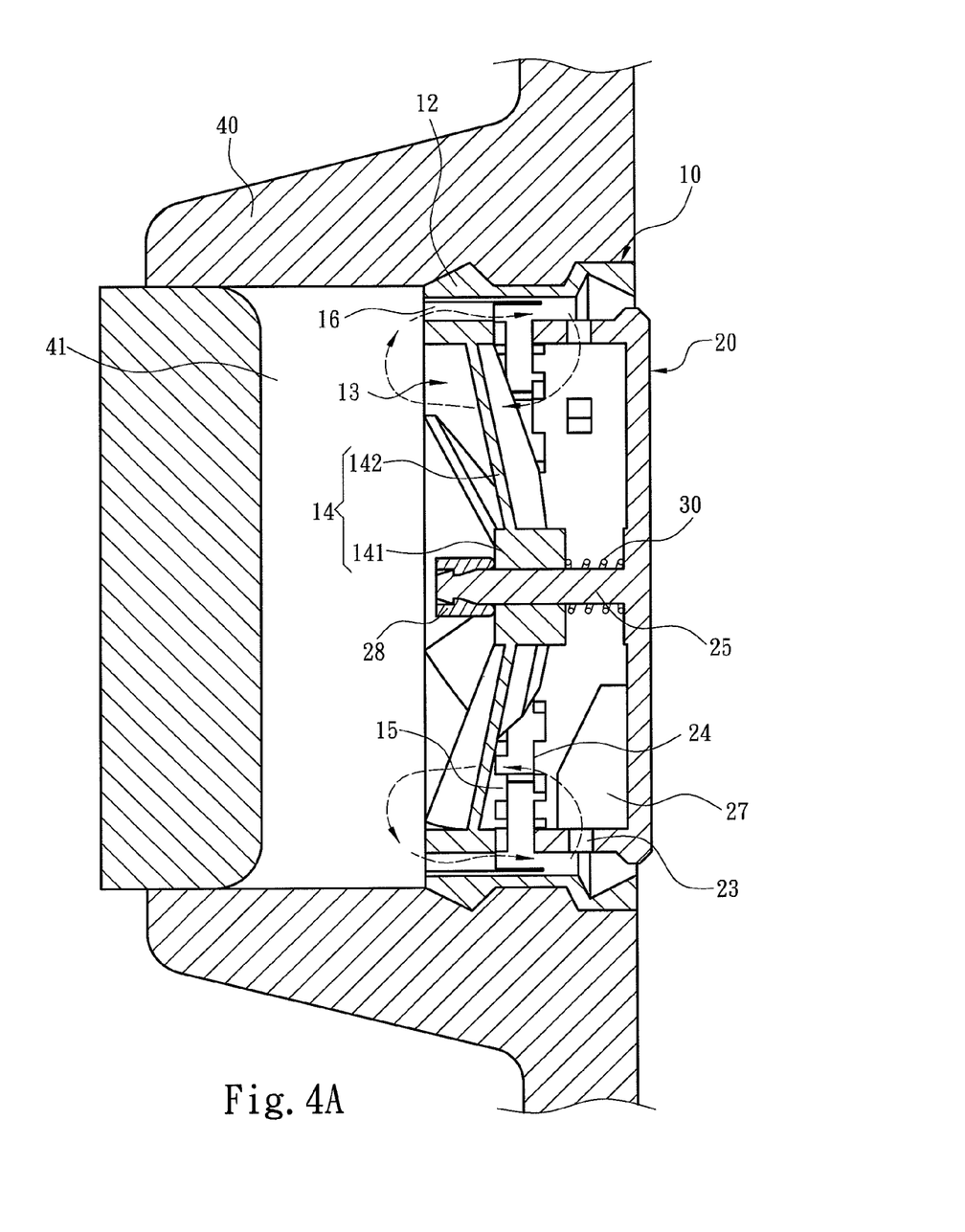
FIGS. 4A to 4C are schematic views of the present invention in operating conditions.
Figure 4B:
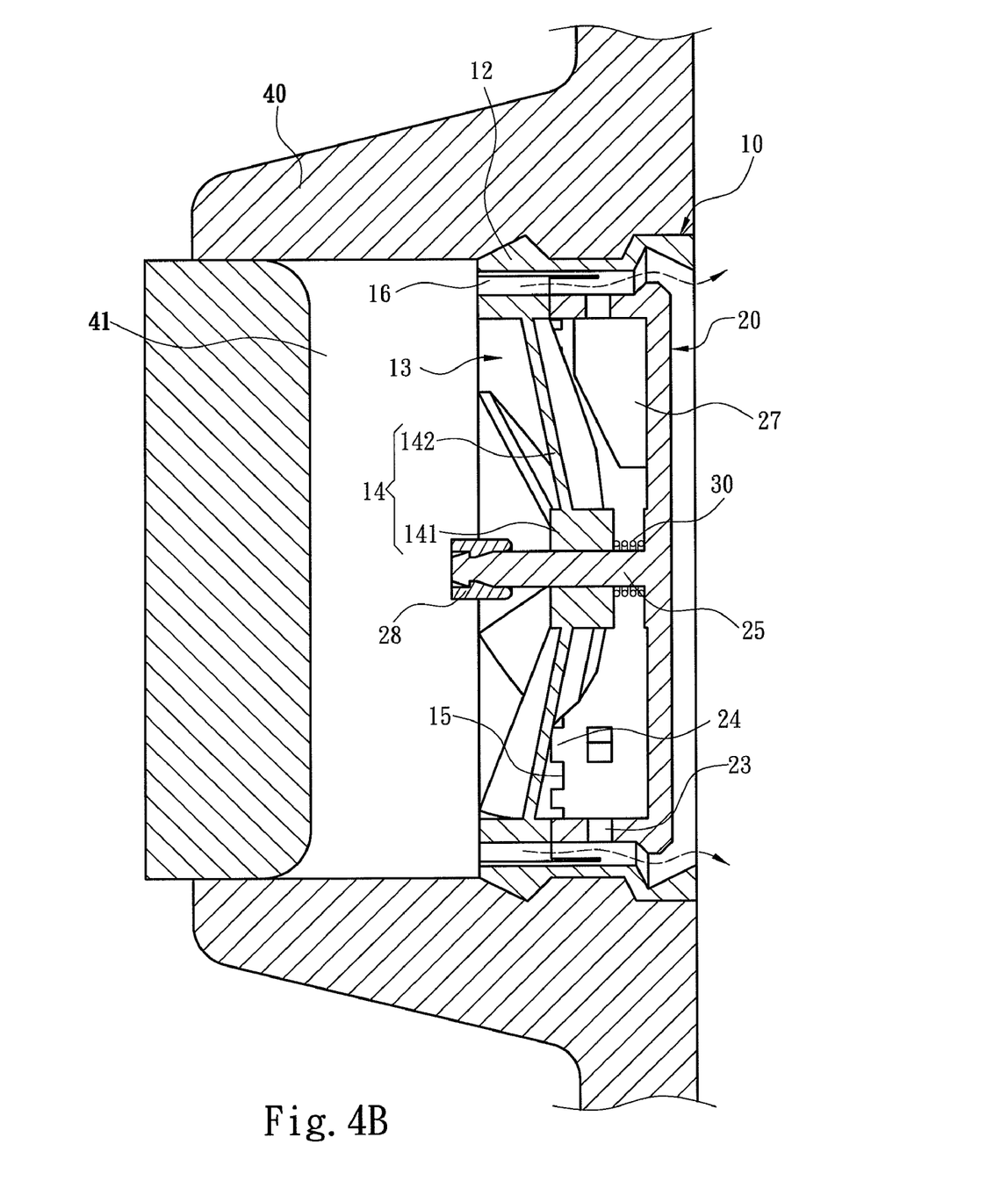
Figure 4C:
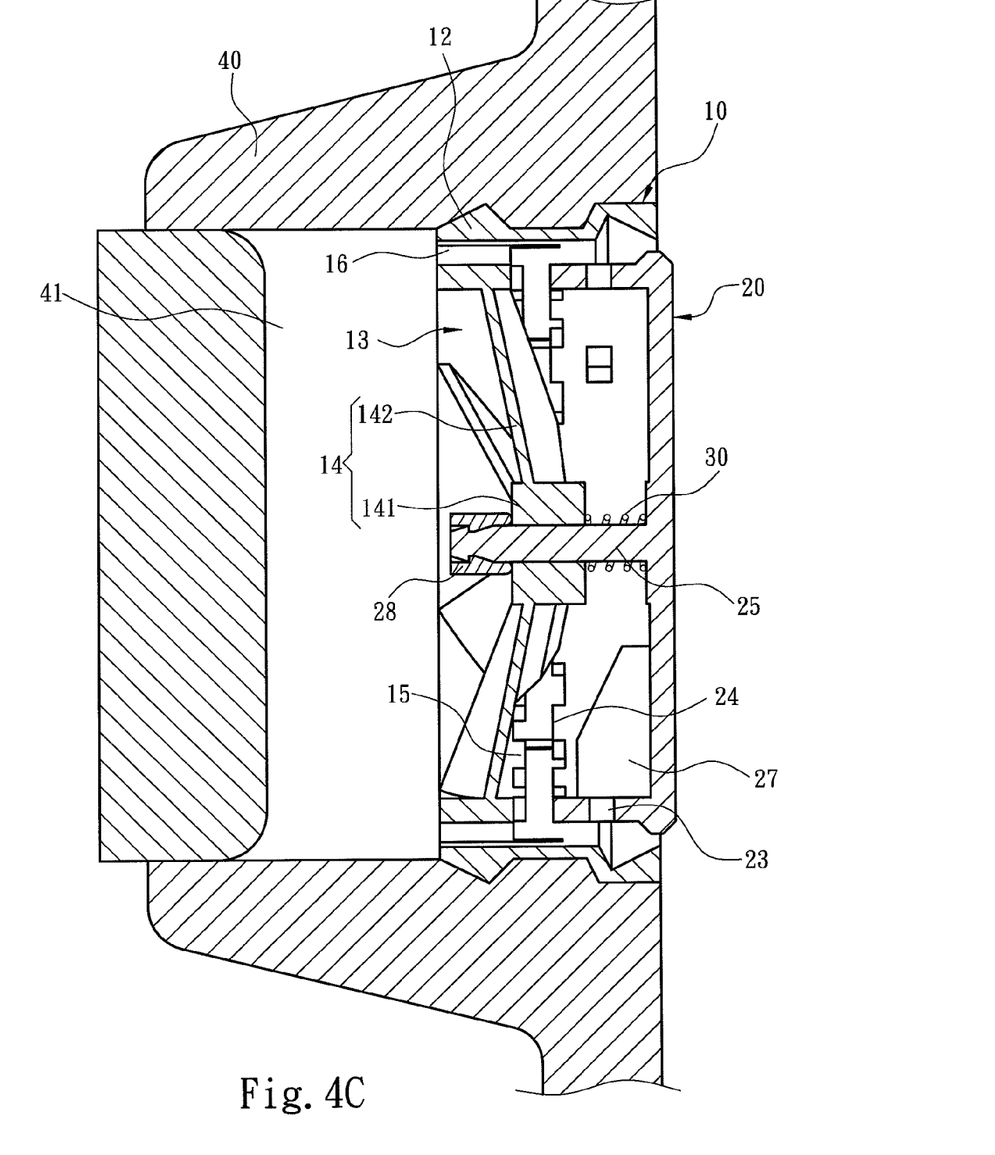
Figure 5A:
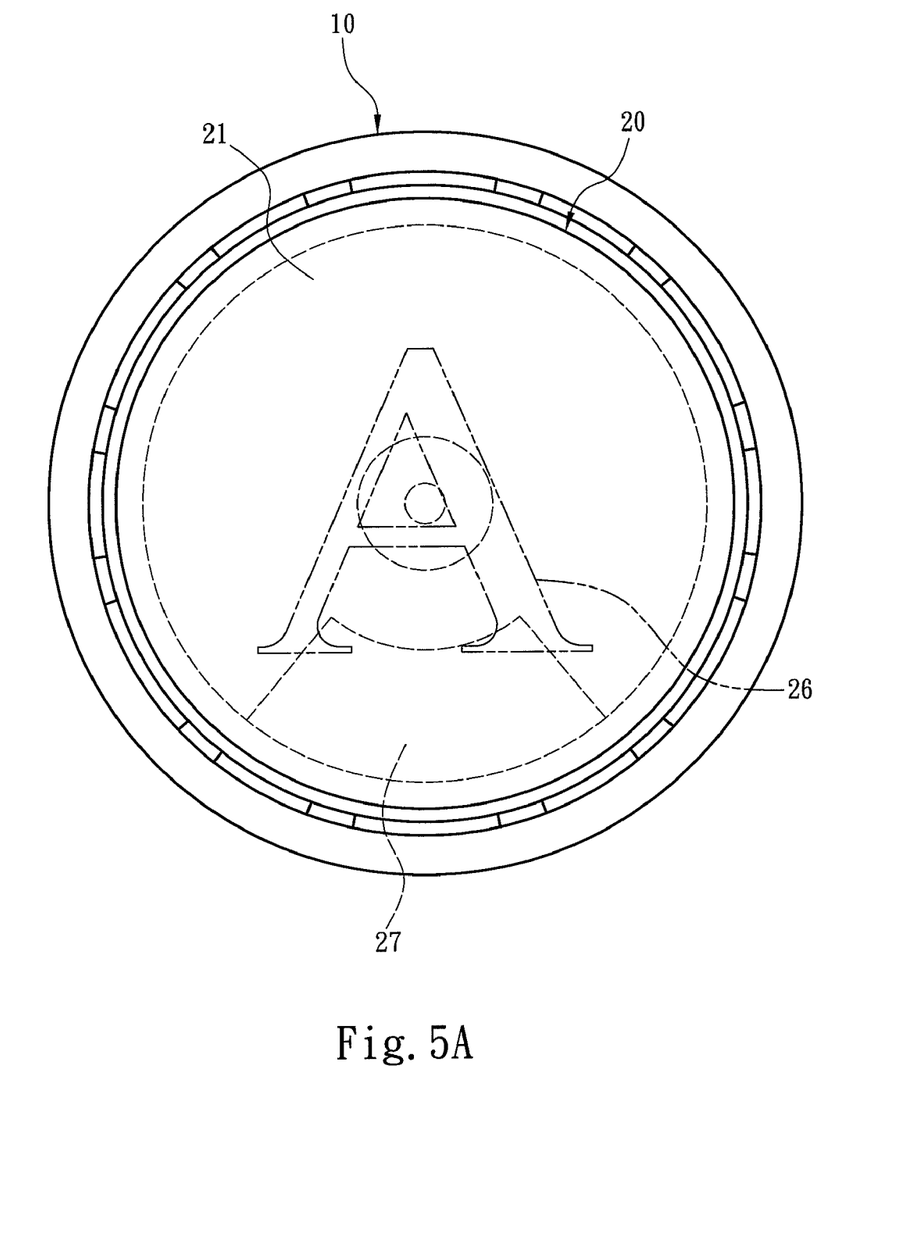
FIGS. 5A to 5C are other schematic views of the present invention in operating conditions.
Figure 5B:
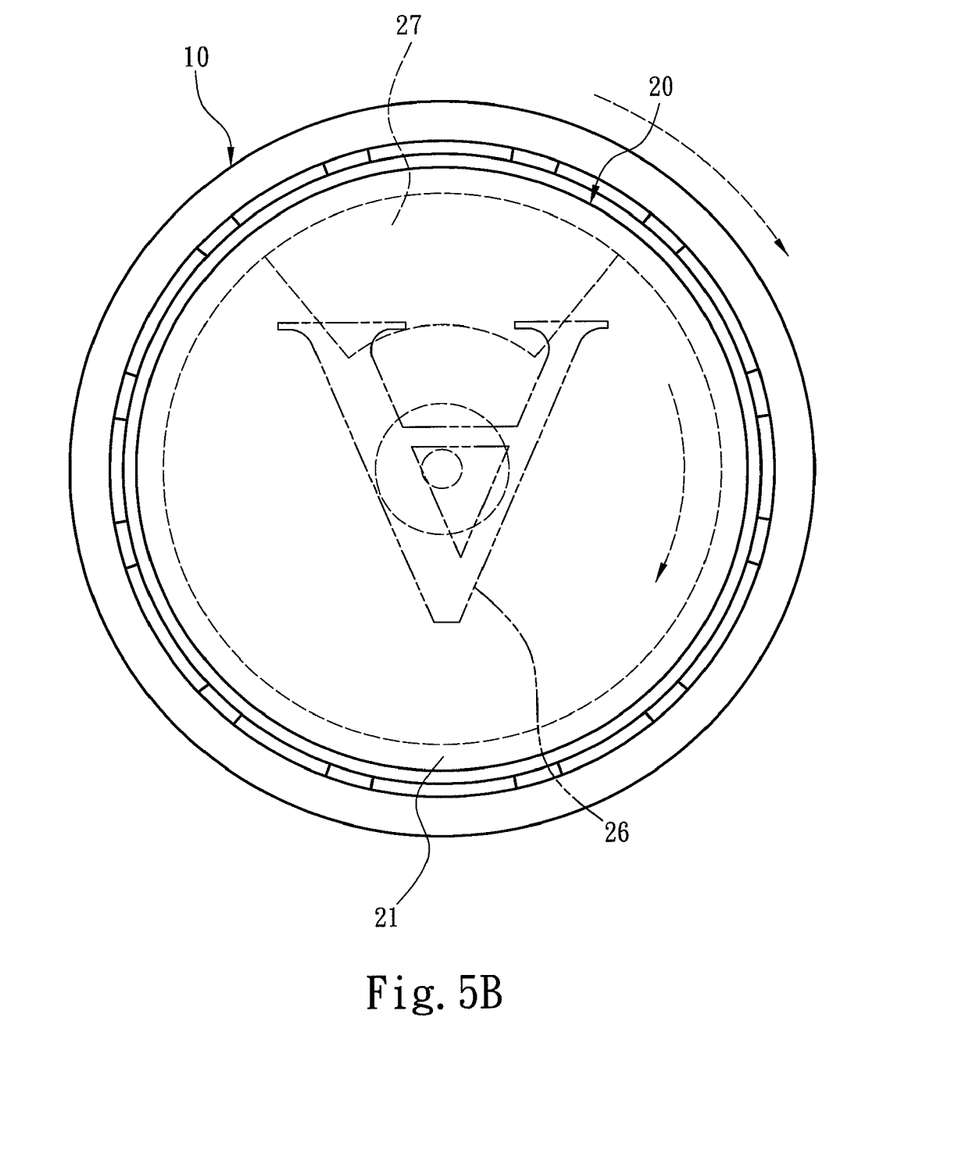
Figure 5C:
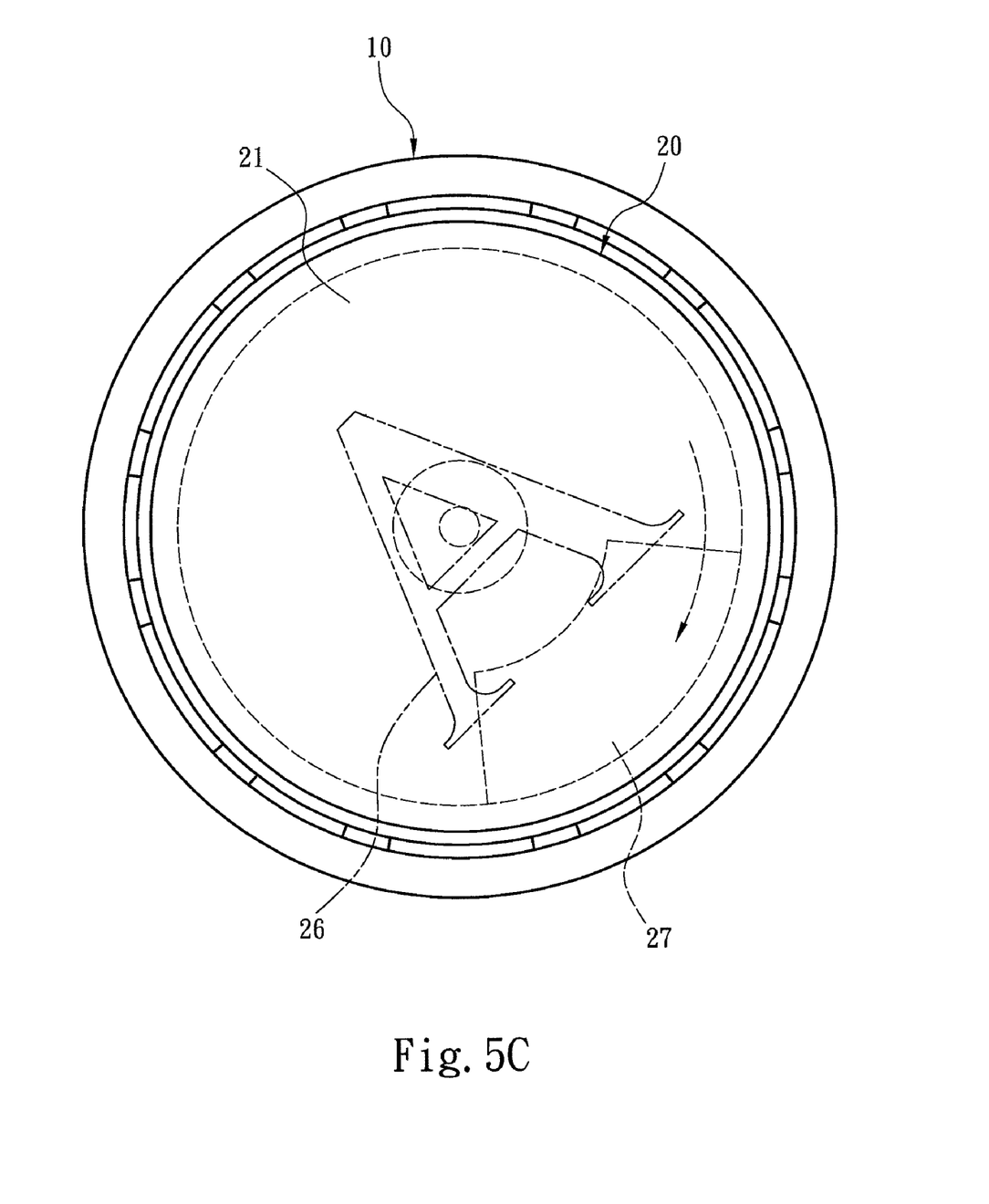

Refer to FIGS. 4A to 4C and FIGS. 5A to 5C for operating conditions of the present invention. When the motor vehicle is started, the wheel 40 drives the fixed base 10 and the air suction portion 14 to rotate synchronously (as shown in FIG. 4A). Now, the gravitation of the weight balancing portion 27 is exerted to the rotary cover 20 to maintain the position of the design pattern 26 on the rotary cover 20 (as shown in FIG. 5A). As the air suction portion 14 rotates and sucks air, and the airflow passage 13 and the apertures 16, 23 form a backflow to suck the rotary cover 20 to compress the elastic member 30, so that the rotary cover 20 is situated at a first position (as shown in FIG. 4B) to form a latching and positioning relationship between the first and second positioning portions 15, 24, and the rotary cover 20 is rotated with the wheel 40 and the fixed base 10 at the first position, and the design pattern 26 on the rotary cover 20 is also rotated synchronously (as shown in FIG. 5B). When the motor vehicle is stopped and the wheel 40 is still, the air suction portion 14 remains still with the fixed base 10 and the wheel 40, and the suction of air is also stopped. Now, the elastic member 30 props the rotary cover 20 away from the fixed base 10, such that the rotary cover 20 is situated at a second position (as shown in FIG. 4C) for releasing the positioning relationship between the first and second positioning portions 15, 24, and the rotary cover 20 is rotated axially with respect to the fixed base 10 by the weight of the weight balancing portion 27 at the second position, and the design pattern 26 on the rotary cover 20 is aligned to a fixed direction (as shown in FIG. 5C).

In conclusion, the rotary wheel cap of the present invention is characterized in that the wheel 40 is rotated with the wheel cap having the design pattern 26 thereon. When the wheel 40 is still, the design pattern 26 on the wheel cap can be rotated axially by itself to a desired fixed direction, such that when the motor vehicle is retarded or stopped, the design pattern 26 can be recognized easily to achieve eye-catching, advertising and promotion effects.

While the invention has been described by means of specific embodiments, numerous modifications and variations could be made thereto by those skilled in the art without departing from the scope and spirit of the invention set forth in the claims.

What is claimed is:

1. A rotary wheel cap, comprising:
    a fixed base which is fixed at a center of a wheel and includes an air suction portion and a first positioning portion, the air suction portion being driven by the fixed base and rotated with the wheel for sucking external air;
    a rotary cover which is installed axially at the fixed base and axially rotated with respect to the fixed base and includes a second positioning portion corresponding to the first positioning portion and a weight balancing portion; and
    an elastic member installed between the fixed base and the rotary cover to provide a returning force for the rotary cover to move against the fixed base;
    wherein the rotary cover is sucked by the air suction portion to compress the elastic member while the wheel is rotating, and the rotary cover is situated at a first position for forming a positioning relationship between the first and second positioning portions, so that the rotary cover is rotated with the wheel at the first position; and when the wheel is stationary, the rotary cover receives the returning force of the elastic member and is situated at a second position for forming a released relationship between the first and second positioning portions, so that the rotary cover is rotated with respect to the fixed base by the weight of the weight balancing portion at the second position.

2. The rotary wheel cap of claim 1, wherein the fixed base includes an outer annular portion, and the outer annular portion includes an airflow passage installed the air suction portion.

3. The rotary wheel cap of claim 2, wherein the outer annular portion includes a plurality of latch hooks for latching and positioning the center of the wheel.

4. The rotary wheel cap of claim 2, wherein the air suction portion includes an axis portion and a plurality of blade portions disposed around the axis portion and coupled to the outer annular portion.

5. The rotary wheel cap of claim 4, wherein the rotary cover includes an axle strut passing through the axis portion, and a fixing cap installed at an end of the axle strut.

6. The rotary wheel cap of claim 5, wherein the elastic member passes through the axle strut between the axis portion and the rotary cover.

7. The rotary wheel cap of claim 2, wherein the rotary cover includes a panel and an inner annular portion connected to the panel and held in the outer annular portion.

8. The rotary wheel cap of claim 1, wherein the first positioning portion and the second positioning portion are corresponding latching concave and convex structures.

9. The rotary wheel cap of claim 1, wherein the fixed base and the rotary cover include a plurality of apertures for guiding air while the wheel is rotating.

10. The rotary wheel cap of claim 1, wherein the rotary cover includes a design pattern.

* * * * *